Nov. 28, 1967 R. O. GUNDERSON ET AL 3,355,596
DIGITAL CIRCUITRY INCLUDING DIFFERENTIAL AMPLIFIER AND OPPOSITE CONDUCTIVITY TRANSISTORS IN LATCHING AND "EXCLUSIVE-OR" CONFIGURATIONS OBVIATING STORAGE DELAYS
Filed Nov. 2, 1964 3 Sheets-Sheet 1
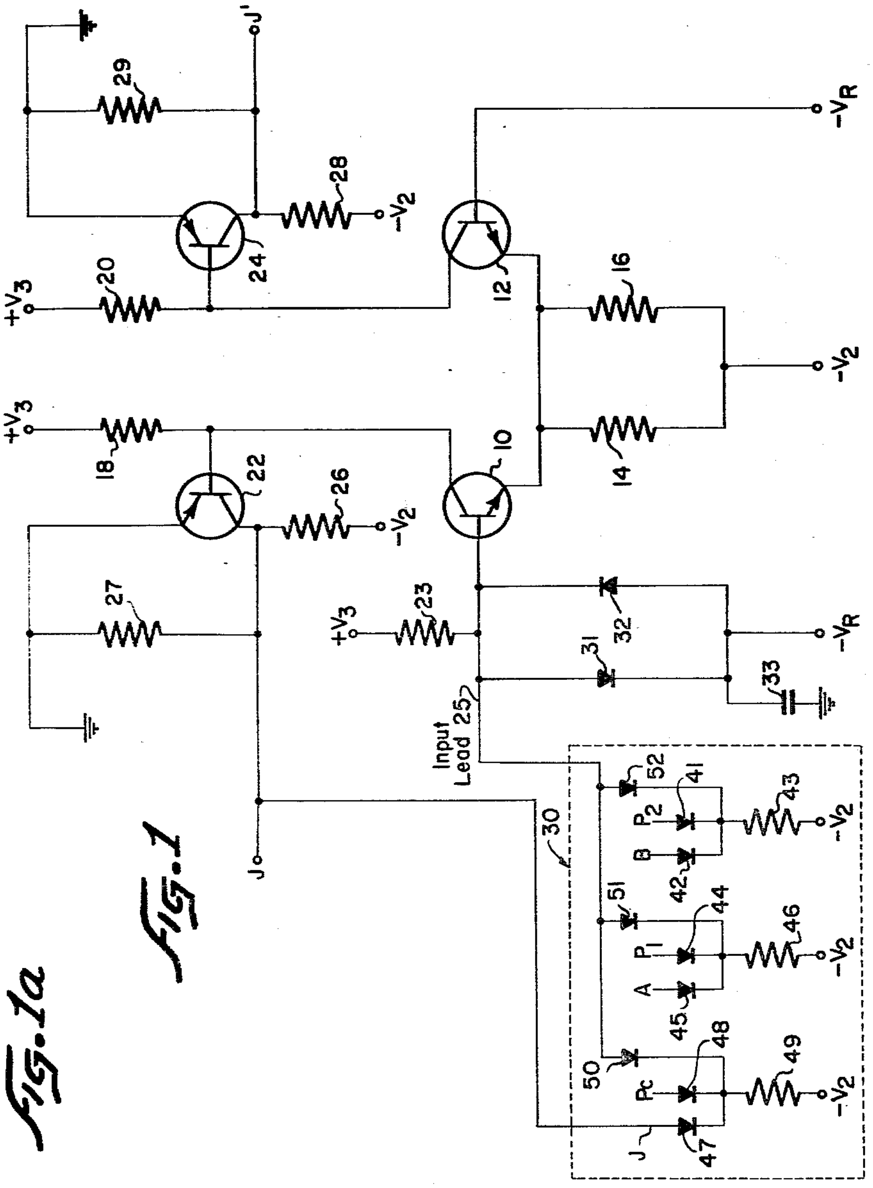
FIG. 1, FIG. 1a
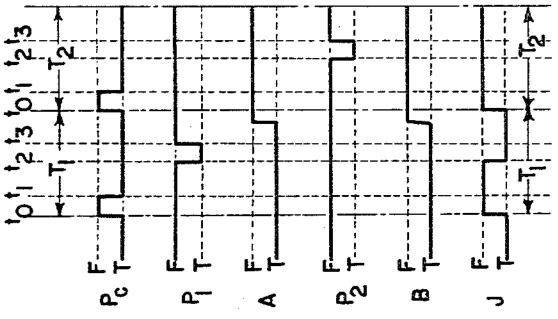
INVENTORS
ROBERT O. GUNDERSON
MARTIN H. JURICK
BY Louis A Kline
John J. Mattlago
Nathan Cass
THEIR ATTORNEYS DIGITAL CIRCUITRY INCLUDING DIFFERENTIAL AMPLIFIER AND OPPOSITE CONDUCTIVITY TRANSISTORS IN LATCHING AND "EXCLUSIVE-OR" CONFIGURATIONS OBVIATING STORAGE DELAYS Filed Nov. 2, 1964

INVENTORS
ROBERT O. GUNDERSON
MARTIN H. JURICK
BY
Louis A Kline
John T. Matlago
Nathan Cass
THEIR ATTORNEYS Nov. 28, 1967 R. O. GUNDERSON ET AL 3,355,596

DIGITAL CIRCUITRY INCLUDING DIFFERENTIAL AMPLIFIER
AND OPPOSITE CONDUCTIVITY TRANSISTORS IN LATCHING
AND "EXCLUSIVE-OR" CONFIGURATIONS
OBVIATING STORAGE DELAYS

Filed Nov. 2, 1964 3 Sheets-Sheet 3

Mode I

| E | F | J | J' |
|---|---|---|---|
| 0 | 0 | 0 | 1 |
| 0 | 1 | 1 | 0 |
| 1 | 0 | 1 | 0 |
| 1 | 1 | 0 | 1 |

Mode II

| E | F | J | J' |
|---|---|---|---|
| 0 | 0 | 0 | 1 |
| 0 | 1 | 0 | 0 |
| 1 | 0 | 1 | 0 |
| 1 | 1 | 0 | 1 |

INVENTORS
ROBERT O. GUNDERSON
MARTIN H. JURICK

BY Louis A. Kline
John T. Matlago
Nathan Cass
THEIR ATTORNEYS

United States Patent Office 3,355,596

Patented Nov. 28, 1967

3,355,596

DIGITAL CIRCUITRY INCLUDING DIFFERENTIAL AMPLIFIER AND OPPOSITE CONDUCTIVITY TRANSISTORS IN LATCHING AND "EXCLUSIVE-OR" CONFIGURATIONS OBVIATING STORAGE DELAYS

Robert O. Gunderson and Martin H. Jurick, Torrance, Calif., assignors to The National Cash Register Company, Dayton, Ohio, a corporation of Maryland Filed Nov. 2, 1964, Ser. No. 408,014

21 Claims. (Cl. 307—88.5)

This invention relates generally to electronic circuitry, and more particularly to novel digital computer switching circuits employing semiconductor elements.

As the computer art continues to progress and computers get faster and faster, the need for reliable, higher speed and more versatile switching circuits increases accordingly. Also, as the art moves towards the use of integrated circuit techniques, the standardization of circuits becomes another important consideration.

It is, therefore, one object of this invention to provide improved reliable and versatile high speed switching circuits.

Another object of this invention is to provide a series of high speed digital computer circuits having standardized sub-circuit portions.

A further object of this invention is to provide an improved latch circuit.

Yet another object of this invention is to provide an improved flip-flop circuit.

A still further object of this invention is to provide an improved "exclusive or" circuit.

Yet a further object of this invention is to provide an "exclusive or" circuit capable of simple and convenient modification to another mode of operation.

An additional object of this invention is to provide the above circuits with a large fan-in capability while maintaining high speed operation.

Another object of the invention is to provide improved combinations of the above circuits in association with digital computer logical circuits.

Figures 2, 2A:
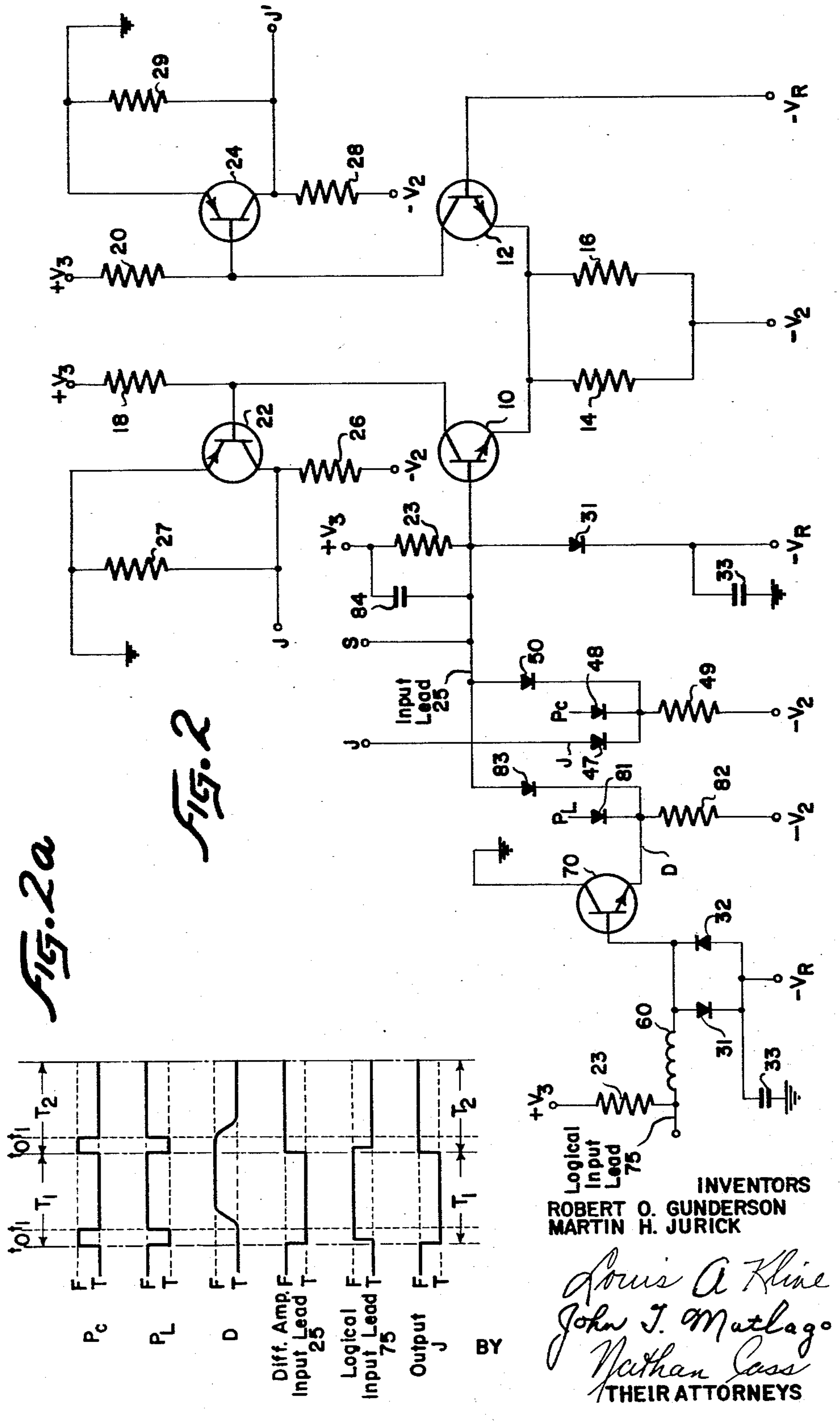
Figures 3, 3A, 3B:
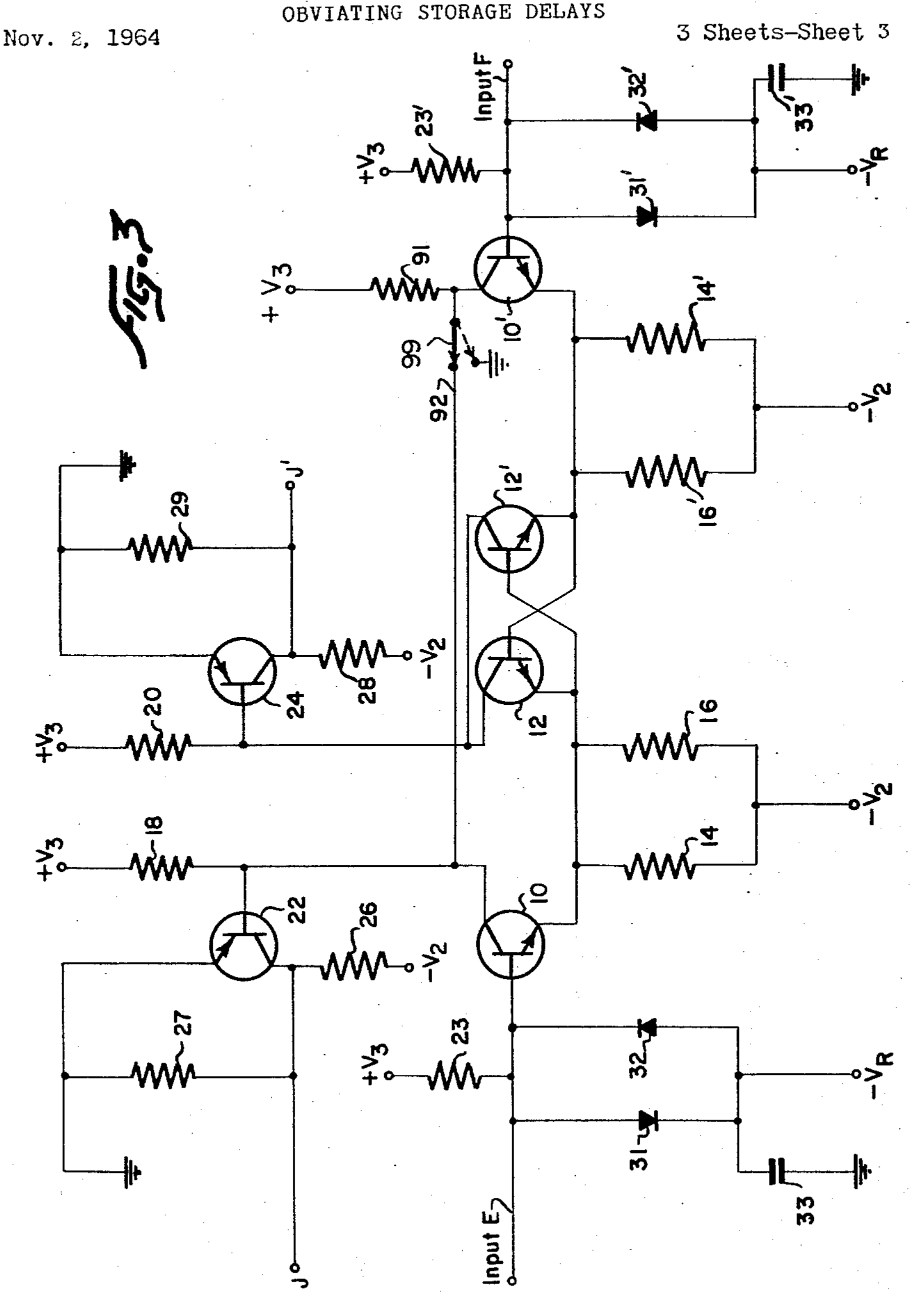

The specific nature of the invention as well as other objects, uses and advantages thereof will become apparent from the following detailed description and accompanying drawings in which:

FIG. 1 is an electrical circuit diagram of an improved latch circuit in accordance with the invention;

FIG. 1*a* is a graph illustrating the operation of the latch circuit of FIG. 1;

FIG. 2 is an electrical circuit diagram of an improved flip-flop circuit in accordance with the invention;

FIG. 2*a* is a graph illustrating the operation of the flip-flop circuit of FIG. 2;

FIG. 3 is an electrical circuit diagram of an improved "exclusive or" circuit; and FIGS. 3*a* and 3*b* are truth tables illustrating two modes of operation of the "exclusive or" circuit of FIG. 3.

Like numerals designate like elements throughout the figures of the drawings.

LATCH CIRCUIT (FIG. 1)

Referring to the latch circuit of FIG. 1, the two NPN transistors 10 and 12 shown therein are connected along with respective emitter coupling resistors 14 and 16 and respective collector resistors 18 and 20 so as to form a differential amplifier. Output stages for this differential amplifier are formed by the two PNP transistors 22 and 24 cooperating with respective resistors 26, 27, 28 and

29 so as to provide inverse (that is, 180 degree out of phase) output signals J and J'. Input signals are supplied to the base of differential amplifier transistor 10 via input lead 25, while the base of differential amplifier transistor 12 receives a constant reference voltage $V_R$ as its input.

Before considering the latch circuit of FIG. 1 in further detail, some general points may be mentioned. It is to be understood that the latch circuit of FIG. 1 may advantageously be employed in a true-false binary digital system as disclosed for example in a commonly assigned copending patent application Ser. No. 426,105, filed Jan. 18, 1965, in the names of Robert O. Gunderson, Sidney L. Valentine, Martin H. Jurick and Paul Higashi. In such a system the inverse outputs J and J' of the latch circuit represent the condition of the latch in response to the true or false logical level of the signal appearing at lead 25. Typically, when the signal at lead 25 is at a true logical level (for example, —3 volts), output J will also be at a true logical level while the inverse output J' will be at a false logical level (for example, 0 volts). This condition of the latch circuit where output J is at a true logical level while output J' is at a false logical level is considered to represent the true state of the latch.

On the other hand, when the signal at lead 25 is at a false logical level while the inverse output J' will be at a true logical level. This alternate condition is considered to represent the false state of the latch.

Now considering the latch circuit of FIG. 1 in more detail, it will be understood that in order to obtain fast switching the circuit values are preferably chosen so that both of the differential transistors 10 and 12 are always in their active region of operation, although only one of these transistors 10 and 12 is permitted to conduct a significant amount of collector current at any one time, the particular one depending on the logical level appearing at lead 25.

The output transistors 22 and 24 are either saturated or cut off depending on the condition of their respective differential amplifier transistors 10 and 12. For example, when the signal appearing at lead 25 is at a false logical level (0 volts), differential amplifier transistor 10 will conduct a significant amount of collector current (for example, 10 milliamperes), while differential amplifier transistor 12 will be just barely conducting (for example, of the order of a few microamperes). The increased collector current conducted by differential amplifier transistor 10 flows through collector resistor 18 to lower the voltage applied to the base of output transistor 22 by an amount sufficient to forward bias transistor 22 to saturation. The output voltage J appearing at the collector of transistor 22 will then be the saturated voltage drop across the collector and the emitter of transistor 22, which is approximately 0 volts corresponding to the false logical level. Since the differential amplifier transistor 12 remains just barely conducting, the voltage applied to the base of output transistor 24 will remain high to maintain the output transistor 24 cut-off, in which case the voltage divided formed by resistors 28 and 29 in conjunction with the voltage source $-V_2$ causes output J' to reside at a true logical level (—3 volts).

When the signal appearing at lead 25 is at a true logical level (—3 volts), instead of at a false logical level (0 volt) as assumed in the previous paragraph, differential amplifier transistor 10 will then be driven to the point of just barely conducting, the effect of which is coupled to the other differential amplifier transistor 12, via the emitter resistors 14 and 16, to cause transistor 12 to now be the one which conducts a significant amount of collector current. Thus, in the same way as described in the previous paragraph for the alternate situation, it will be output transistor 24 which is now caused to be saturated by the increased collector current flow in differential amplifier transistor 12, while transistor 22 will remain cut off. For this condition, therefore, it will be output J' which is at a true logical level while output J will be at a false logical level.

The dashed block 30 in FIG. 1 represents typical logical circuitry employed in cooperation with the other portions of FIG. 1. In order to provide for a large number of logical circuits (such as typically illustrated by block 30) to be coupled to the input lead 25 (high fan-in), a clamping circuit comprised of parallel diodes 31 and 32 is provided connected between the base of differential transistor 10 and the reference voltage source $-V_R$, and via capacitor 33 to circuit ground. This clamping circuit, by limiting the base swing to no more than a diode voltage drop above and below the reference voltage $V_R$, prevents the input capacity unavoidably obtained when many logical inputs are employed from unduly slowing up the circuit. In such a case, it is also desirable to keep the logic input current as high as possible, for example, 3 milliamperes. With this value of logic current, and appropriate choice of bias resistor 23, there will always be about 1 milliampere of current in one of the two clamp diodes 31 and 32. This current provides noise immunity for the circuit since any noise on input lead 25 must displace the current in the clamp diode 31 or 32 before it can affect the state of the differential amplifier transistor 10 which receives the signal input.

The remaining portions of the circuit of FIG. 1 to be described are those shown within block 30 in which diodes 41 and 42 and resistor 43 form a first AND gate, diodes 44 and 45 and resistor 46 form a second AND gate, diodes 47 and 48 and resistor 49 form a third AND gate, and diodes 50, 51 and 52 serve as the diodes of an OR gate. As is well known, an AND gate provides a true output only when all of its inputs are true, while an OR gate provides a true output when any one or more of its inputs are true. The graphs of FIG. 1*a*, illustrate typical operation of the circuit of FIG. 1 over two exemplary operating cycles $T_1$ and $T_2$ in response to logical input signals A and B, and timing signals $P_c$, $P_1$ and $P_2$ applied to the respective AND gates within block 30.

It will be noted in FIG. 1 that the output J is connected along with timing signal $P_c$ to the AND gate formed by diodes 47 and 48 and resistor 49, the output of which AND gate is in turn connected through OR gate diode 50 to input lead 25. It is this recirculation of the output J to the input lead 25 that acts to latch the circuit of FIG. 1 in accordance with the logical input signals A and B as will now be described.

Initially, it will be noted from FIG. 1*a*, that timing signal $P_c$ is normally true except for a short period $t_0$–$t_1$ at the beginning of each cycle when $P_c$ goes false. On the other hand, timing signals $P_1$ and $P_2$ are normally false and may or may not go true for a short period $t_2$–$t_3$ in the middle of each cycle. depending upon which of the respective logical input signals A or B are to operate the latch during the cycle.

As shown in FIG. 1*a*, timing signal $P_c$ goes false for the period $t_0$–$t_1$, at the beginning of each cycle. During this period $t_0$–$t_1$, timing signals $P_1$ and $P_2$ are also false so that the outputs of all of the AND gates in block 30 will be false during $t_0$–$t_1$. A false logical level signal thus appears on input lead 25 and acts to clear the circuit of FIG. 1 to its false state, if it is not already in a false state. This short period $t_0$–$t_1$ at the beginning of each of the cycles $T_1$ and $T_2$ is, therefore, in effect a clearing period which returns the circuit to its false state, regardless of its previous state, and thereby provides a convenient starting condition for the remainder of the cycle.

Still referring to FIG. 1*a* along with FIG. 1, it will be seen that, during the period $t_1$–$t_2$, when timing signal $P_c$ is true again, and prior to either of timing signals $P_1$ or $P_2$ going true, the circuit will remain in the false state since output J is false to cause a false logical level signal to appear on input lead 25. Considering cycle $T_1$ first, it will be noted that timing signal $P_1$ goes true during the period $t_2$–$t_3$ so as to thereby permit the logical level of input signal A to appear on input lead 25. Since, as shown in FIG. 1*a*, input signal A is at a true logical level during the period $t_2$–$t_3$ when $P_1$ is true, a true logical level signal will appear on input lead 25 during $t_2$–$t_3$ to switch the circuit to its true state, as indicated in FIG. 1*a* by output J being switched true at $t_2$. The circuit is now latched in this true state for the remainder of the cycle $T_1$, since the true state of timing signal $P_c$ causes the true logical level of output J to be applied via AND gate diode 47 and OR gate diode 50 to the input lead 25 during the remainder of $T_1$.

Now considering the second cycle $T_2$ illustrated in FIG. 1*a*, it will be understood that, in the same manner as described during $T_1$, the circuit will clear to the false state during period $t_0$–$t_1$, regardless of its previous state. Thus, as illustrated in the graph of FIG. 1*a*, output J is cleared to the false state during $t_0$–$t_1$ from the true state to which it was set during $T_1$.

Also, as occurred during $T_1$, the circuit remains in this false state to which it is cleared during $t_0$–$t_1$ until either the $P_1$ or $P_2$ timing signal goes true during $t_2$–$t_3$. During cycle $T_2$, it is timing signal $P_2$ which goes true during $t_2$–$t_3$, thereby causing the circuit to be set in accordance with the logical level of output signal B. Since, as shown in FIG. 1*a*, input signal B is at a false logical level during period $t_2$–$t_3$ of cycle $T_2$, a false logical level signal appears on input lead 25 to cause the circuit to remain in the false state for the remainder of cycle $T_2$, as illustrated in FIG. 1 by the output J remaining false during $T_1$.

It is to be noted that instead of having timing signals $P_1$ and $P_2$ occur during separate cycles as illustrated in FIG. 1*a*, they could occur concurrently during a cycle, in which case the circuit would respond to the logical sum of inputs A and B.

It is also to be understood that an alternate operation of the latch circuit of FIG. 1 may also be provided besides that just described in connection with FIG. 1*a*. In such alternate type operation, the clear timing signal $P_c$ is caused to go false concurrently with the other timing signals $P_1$ or $P_2$ going true. For this type of operation, the input signal A or B will then set the latch in accordance with its logical level and the timing signal $P_c$ is caused to go true again in sufficient time to latch the circuit in the state to which it was set by the input logical level A or B. In order to assure latching it is desirable that $P_1$ or $P_2$, after going true, remain true for a short time after $P_c$ goes true. It will further be understood that, as is possible for operation in accordance with FIG. 1*a*, it is also possible when this alternate operation is employed to have timing signals $P_1$ and $P_2$ occur concurrently so that the circuit would then respond to the logical sum of inputs A and B.

Having described the construction and various typical operations of the latch circuit of FIG. 1, the following typical specific values for the circuit are now presented below, it being understood that such typical specific values are presented merely for illustrative purposes and should not be considered as limiting the scope of the invention in any way.

| | | |
|---|---|---|
| Resistors **14** and **16** | ohms | 1050 |
| Resistor **18** | do | 715 |
| Resistor **20** | do | 750 |
| Resistor **23** | do | 5000 |
| Resistors **26** and **28** | do | 470 |
| Resistors **27** and **29** | do | 270 |
| Resistors **43, 46** and **49** | do | 2400 |
| Reference voltage source $V_R$ | volts | −1.5 |
| Voltage source $V_2$ | do | −8 |
| Voltage source $V_3$ | do | 3.5 |
| Time period of each of cycles $T_1$ and $T_2$ | nanoseconds | 800 |

FLIP-FLOP (FIG. 2)

Referring to the flip-flop of FIG. 2, it will be noted at the outset that the same basic differential amplifier and output stages as employed in the latch circuit of FIG. 1 are also included in the flip-flop circuit of FIG. 2. An important difference between the two, however, is in the input portion, the purposes of which will now be explained.

It will be understood that instances occur in computer operation whereby the output of a flip-flop is fed through intermediate logical circuitry back to its input with only relatively little delay. In other words, the output of such a flip-flop directly affects its input. Such an output-input relationship is to be distinguished from the output-input feedback employed to obtain latching in the latch circuit of FIG. 1*a*, and which is also employed in the flip-flop of FIG. 2 in a like manner in response to a like timing signal $P_c$ using like AND diodes 47 and 48 along with resistor 49, and OR diode 50, the output of OR diode being fed to the input lead 25 of the differential amplifier. The undesirable output-input relationship being considered here is not one of latching, but is an unwanted one which may nevertheless occur and prevent the flip-flop from latching properly, since this unwanted feedback may change the logical level of the input before the flip-flop can latch.

Accordingly, in addition to the desired latching function incorporated into the flip-flop input circuitry, a delay is also incorporated into the input using an inductance 60 to provide a fixed delay between the time that a logical level input signal appears on logical input lead 75, and the time it is applied to input transistor 70. It is to be noted that input transistor 70, which is connected as an emitter follower, provides current amplification so as to permit a large fan-in capability for the flip-flop. It is also to be noted that diodes 31 and 32 and capacitor 33 connected across the input of transistor 70 serve a similar clamping function as do diodes 31 and 32 in FIG. 1 to limit the base swing of transistor 70 to no more than a diode voltage drop above and below the reference voltage $V_R$ so as to overcome input capacity effects.

Typical operation of the flip-flop circuit of FIG. 2 will now be explained with additional reference to the graphs of FIG. 2*a* showing the operation of the flip-flop circuit of FIG. 2 for two typical operating cycles $T_1$ and $T_2$. Since the operation of the differential amplifier and its output stages have already been explained in connection with FIGS. 1 and 1*a*, their operation will not be repeated here. It is sufficient for the purposes of this flip-flop description to remember that the outputs J and J' are responsive to the logical level appearing at input lead 25, J being true and J' being false when input lead 25 is at a true logical level, and vice versa when input lead 25 is at a false logical level. Also, like the latch of FIG. 1, the flip-flop of FIG. 2 is considered true when J is true (J' false) and false when J is false (J' true).

Initially, it will be noted in FIG. 2*a* that timing signal $P_c$, as in FIG. 1*a*, is normally true except for a short period $t_0$–$t_1$ at the beginning of each cycle when $P_c$ goes false. Also during period $t_0$–$t_1$ in FIG. 2*a*, a logical timing signal $P_L$, which is normally false, goes true. As will be understood from FIG. 2, the logical timing signal $P_L$ and the emitter output D of transistor 70 are inputs of an AND gate formed by AND diode 81, the emitter output of transistor 70 and resistor 82. Diode 83 serves as an OR diode to apply the output of this AND gate to differential amplifier input lead 25.

Consequently, when logical timing signal $P_L$ goes true during time $t_0$–$t_1$ in FIG. 2*a* along with timing signal $P_c$ going false to unlatch the flip-flop, the logical level D appearing at the emitter of transistor 70 will be applied to differential amplifier input lead 25 to cause output J to be switched in accordance therewith. As shown in FIG. 2*a*, the logical level D of the emitter of transistor 70 during $t_0$–$t_1$ is true so that a true logical level signal is applied via OR diode 83 to the differential amplifier input lead 25 to switch the flip-flop (which is initially assumed in the false state) to the true state, as indicated by output J being switched true at $t_0$.

It will be noted in FIG. 2*a* that signal D remains true throughout $t_0$–$t_1$ to permit the flip-flop to remain in the true state to which it was switched by D throughout the period $t_0$–$t_1$. Then when $P_c$ goes true again at $t_1$, the true logical level of J will be applied to input lead 25 via OR diode 50 to latch the flip-flop in the true state for the remainder of cycle $T_1$. In order to give the circuit sufficient time to latch, logical timing signal $P_L$ may be caused to remain true along with timing signal $P_c$ for a short time beyond $t_1$, until latching is assured, as pointed out in connection with the alternate possible operation of the latch circuit of FIG. 2. Or, as shown in FIG. 2*a*, the timing signals $P_L$ and $P_c$ can be caused to switch simultaneously, in which case a capacitor 84 is preferably provided (as shown in FIG. 2) in parallel with resistor 23 so as to provide sufficient storage of the logical input on input or input 25 when $P_L$ becomes false at $t_1$ so as to still assure that timing signal $P_c$ will provide proper latching when it also goes true at $t_1$.

The previous operative description during cycle $T_1$ in FIG. 2*a* has assumed that the logical level of the signal D on the emitter of transistor 70 has remained fixed at a true logical level throughout $t_0$–$t_1$, so that the logical level applied to input lead 25 likewise receives a true logical signal during $t_0$–$t_1$. However, it will be understood from the initial remarks concerning the flip-flop that the switching of the output J true at $t_0$ in response to the true logical level D could, as a result of feedback of the output to the input through intermediate logical circuitry, cause the logical level on the logical input lead 75 to switch to the false state in the middle of the period $t_0$–$t_1$. Such a situation is illustrated in FIG. 2*a* by the graph corresponding to the signal on input lead 75.

If the inductance 60 were not provided to delay the effect of this change of the logical signal appearing on input lead 75, then the logical level on emitter output D, and thus on differential amplifier input lead 25, will go false at the same time as input lead 75, and would prevent proper switching of the flip-flop. However, inductance 60 acts to delay the effect of this change so as to provide proper switching and latching, as illustrated by the graph corresponding to signal D in FIG. 2*a*. The value of the inductance 60 is chosen so as to provide sufficient delay to assure proper latching of the flip-flop in the presence of such output-input feedback. With a cycle period of 800 manoseconds, the value of the inductance may typically be chosen to provide a delay of 50 manoseconds.

Now considering the second cycle $T_2$ in FIG. 2*a*, it will be understood that during $t_0$–$t_1$, when $P_c$ goes false and $P_L$ goes true, flip-flop will now be switched false in response to the false logical level of signal D, as illustrated in FIG. 2*a* by the output J becoming false at $t_0$. For cycle $T_2$, it is assumed that, as a result of output-input feedback through intermediate logical circuitry, the switching of the flip-flop false at $t_0$ causes the logical level on input lead 75 to be switched true prior to time $t_1$, as shown by the graph in FIG. 2*a* corresponding to logical input lead 75. However, the delay introduced by inductance 60 again, as during cycle $T_1$, assures proper switching and latching of the flip-flop, as illustrated by the graph in FIG. 2*a* corresponding to signal D in FIG. 2*a* which shows how the false logical level of signal D is retained until after period $t_0$–$t_1$.

It will thus be evident that the simple provision of the inductor ahead of the latching logic in the input circuit of the flip-flop permits the same basic fast acting latch circuit illustrated in FIG. 1 to be advantageously employed without interfering with the latching operation or adding undue complexity to the circuit.

A final point to consider with respect to the flip-flop of FIG. 2 is the input S shown being fed to differential amplifier input lead 25. This input S is normally at a false logical level and can be used independently of the other logical inputs to set the flip-flop to the true state at any desired time.

EXCLUSIVE OR CIRCUIT (FIG. 3)

Referring now to FIG. 3, and assuming that switch 99 is in the position indicated by the solid line, an "exclusive or" circuit is disclosed which will be seen by a comparison with FIG. 1 to essentially comprise two differential amplifiers of the FIG. 1 type. These differential amplifiers are connected in parallel to a single pair of output stages without any latching input circuitry, and with the two differential amplifiers interconnected so that their logical inputs E and F are compared to each other, rather than to a reference voltage $V_R$ as in FIG. 1.

For purposes of identification and explanation, the components of differential amplifier on the right in FIG. 3 are indicated by primed numerals, but it is to be understood that they may have the same values as the unprimed components in the other differential amplifier on the left in FIG. 3. It may also be noted at this point that the respective input circuitry comprised of diodes 31 and 32 and capacitor 33 for the left differential amplifier, and diodes 31′, 32′ and capacitor 33′ serve the same clamping purpose as previously described in connection with FIG. 1.

Now considering the interconnection of the differential amplifiers of the "exclusive or" circuit of FIG. 3 in more detail, it will be seen that the collectors of differential transistors 10 and 10′ are connected together, as are the collectors of transistors 12 and 12′. Thus, collector resistor 20 serves as a common collector resistor for transistors 12 and 12′, while the parallel combination of collector resistor 18 of transistor 10 and collector resistor 91 of transistor 10′ is common to transistors 10 and 10′. Collector resistor 91 of transistor 10′ is given a different numeral in FIG. 3, since it has a value about two-thirds of its corresponding collector resistor 18. The purpose of providing this lower value common collector resistor 91 will become evident hereinafter.

The operation of the "exclusive or" circuit of FIG. 3 will now be considered in detail. Initially, it is to be understood that the output J in FIG. 3 represents the "exclusive or" function of the inputs E and F, while output J′ represents the inverse of the "exclusive or" function. In other words, using well known Boolean notation the outputs J and J′ may be represented in terms of the inputs E and F as follows:

$$J=E'F+EF'$$
$$J'=(E'F+EF')'=E'F'+EF$$

As an aid in explaining the operation of the "exclusive or" circuit of FIG. 3, the above equations are represented in the form of a conventional truth table as shown in FIG. 3*a* in which E and F represent the input signals to the "exclusive or" circuit, J and J′ represent the output signals from the "exclusive or" circuit, and "1" and "0" represent true and false states, respectively, of the signals E, F, J and J′.

An understanding of the operation of the "exclusive or" circuit of FIG. 3 can best be gained by starting with a consideration of the differential amplifier transistors 12 and 12′, each of which has its base connected to the emitter of the other transistor—that is, their bases and emitters are cross-coupled.

Now referring to the truth table of FIG. 3*a* along with FIG. 3, the first and fourth lines of the truth table will be considered first. These first and fourth lines represent the situation where E and F are the same—that is both "0" (false), or both "1" (true). For this situation, the E and F inputs applied to transistors 10 and 10′ in FIG. 3 will be the same, in which case the emitters of transistors 10 and 10′ will both be at approximately the same voltage. It will be understood, therefore, that approximately zero volts will be applied between the base and emitter of each of the corresponding transistors 12 and 12′. For such a condition, transistors 12 and 12′ will both be just barely conducting, the effect of which is coupled to respective transistors 10 and 10′, via respective emitter resistors 14, 16 and 14′, 16′ so as to cause both transistors 10 and 10′ to conduct a significant amount of collector current. This will occur regardless of whether inputs E and F are both false or both true since, as long as inputs E and F are the same, both of transistors 12 and 12′ will remain just barely conducting.

In summary, therefore, when inputs E and F are the same, as represented by the first and fourth lines of the true table of FIG. 3*a*, transistors 12 and 12′ will both be just barely conducting, while transistors 10 and 10′ will both conduct a significant amount of collector current. With both of transistors 12 and 12′ just barely conducting, the voltage on the base of output transistor 24 will remain high to maintain transistor 24 cut off so as to produce a true output logical level for output J′, in agreement with the first and fourth lines of the truth table of FIG. 3*a*. On the other hand, since both transistors 10 and 10′ conduct a significant amount of collector current when E and F are the same, the voltage applied to the base of output transistor 22 will be lowered sufficiently forward bias transistor 22 to saturation and thereby provide a false logical level for output J, again in agreement with the first and fourth lines of the truth table of FIG. 3*a*.

The remaining conditions of the "exclusive or" circuit of FIG. 3 to be considered are those corresponding to the situation where inputs E and F are different—that is, where one is true and one is false—as represented by the second and third lines of the truth table of FIG. 3*a*. Considering the second line first where E is "0" (false) and F is "1" (true), it will be understood from FIG. 3 that, in response to the appearance of this condition, transistor 10 will conduct a greater amount of collector current while transistor 10′ will conduct a lesser amount of collector current. This results in the base-to-emitter voltage of transistor 12′ rising sufficiently to cause transistor 12′ to conduct a significant amount of collector current, while the base-to-emitter voltage of transistor 12 stays low to cause transistor 12 to remain just barely conducting.

The end result of this $E=$"0" (false) and $F=$"1" (true) condition represented by the second line in FIG. 3*a* is that transistors 10 and 12′ will conduct a significant amount, while transistors 10′ and 12 will be just barely conducting. Since at least one of transistors 12 and 12′ conducts a significant amount of collector current, the voltage on the base of output transistor 24 to which the collectors of both transistors 12 and 12′ are connected will be lowered sufficiently to saturate output transistor 24 and thereby provide a false logical level for output J′, in agreement with the second line of FIG. 3*a*.

Considering now output J for this condition of $E=$"0" and $F=$"1" represented by the second line of FIG. 3*a*, it will be noted from the previous discussion that only transistor 10 of transistors 10 and 10′ is conducting a significant amount of collector current. If only the single collector resistor 18 were present for transistors 10 and 10′, as is the case with regard to the single collector resistor 20 employed for transistors 12 and 12′, the fact that only transistor 10 is conducting would be sufficient to cause saturation of output transistor 22, as occurs for output transistor 24. However, as mentioned at the beginning of the description of the "exclusive or" circuit of FIG. 3, the lower value collector resistor 91 is also provided. This collector resistor 91 is chosen to have a sufficiently low value so that its parallel combination with resistor 18 produces a collector resistance which is sufficiently small so that both transistors 10 and 10′ must conduct a significant amount of current (as occurs for the conditions corresponding to the first and fourth lines in FIG. 3*a*) in order to saturate output transistor 22. Thus, since only transistor 10 is conducting for the condition $E$="0" and $F$="1" corresponding to the second line of FIG. 3*a*, output transistor 22 remains cut off to provide a true logical level for output J in agreement with the second line of FIG. 3*a*.

The final condition of the "exclusive or" circuit of FIG. 3 remaining to be considered is when $E$="1" and $F$="0" as represented by the third line of the truth table of FIG. 3*a*. This condition is operatively similar to that described for the second line in FIG. 3*a*, except that it is now transistors 10' and 12 which will be caused to conduct a significant amount of current, while transistors 10 and 12' will be just barely conducting. As a result, the outputs J and J' will be true and false, respectively, just as is obtained for the second line in FIG. 3*a*. This same result is obtained for both the second and third lines in FIG. 3*a* corresponding to the situation where the E and F inputs are different since, in both situations, only one of transistors 12 and 12' is conducting to cause output J' to be false, and only one of transistors 10 and 10' is conducting to cause output J to be true, since J will be true unless both transistors 10 and 10' are conducting a significant amount of current, while only one of transistors 12 and 12' need be conducting a significant amount of current to make J' false.

Having described the construction and operation of the "exclusive or" circuit of FIG. 3 (which will hereinafter be referred to as mode I), an alternate mode of operation (which will hereinafter be referred to as mode II) will now be described which can be achieved with a relatively simple change in the circuit of FIG. 3. The change required for mode II is to disconnect or open the lead 92 which connects the collector of transistor 10' to the collector of transistor 10, and connect the collector of transistor 10' to circuit ground, as can readily be obtained by moving switch 99 in FIG. 3 to the dashed position. The resulting logical operation of the circuit will then be as illustrated by the truth table of FIG. 3*b*, which is also representable by the following Boolean equations:

$$J=EF'$$

$$J'=(E'F+EF')'=E'F'+EF$$

It will be noted by reference to the truth tables of FIGS. 3*a* and 3*b* that the logical output for mode II is the same as previously described for mode I, except for the condition $E$="0" (false) and $F$="1" (true) corresponding to the second line in FIG. 3*b* in which a false value of J is obtained instead of a true value as in FIG. 3*a*.

The reason why the operation of mode II is the same as for mode I in the first, third and fourth lines of FIGS. 3*a* and 3*b* will be understood by noting that transistors 12 and 12' operate in mode II in the same manner as in mode I and, as a similar analysis will show, results in the same values of J and J' for these conditions. This is so even though the collectors of transistors 10 and 10' are disconnected since, in such a case, it is only necessary (as in FIG. 1) that transistor 10 conduct a significant amount of current in order to make J false.

Now considering the one different condition between modes I and II where E="0" and F="1" corresponding to the sceond line in FIG. 3*b*, it will be understood that it is because the collector resistor 91 is no longer connected across the collector resistor 18 that output J becomes false. This occurs because the application of a "0" or false input to transistor 10, which causes it to conduct a significant amount of current, is now sufficient by itself to lower the voltage at the base of output transistor 22 so as to produce a false signal for output J, in agreement with the third line of FIG. 3*b*.

*Conclusion*

While this description has been concerned with particular embodiments of the novel circuits disclosed herein, it is to be understood that many variations in construction and arrangement as well as in the use of these circuits may be provided without departing from the scope of this invention. The present invention, therefore, is to be considered as including all such possible modifications, variations and other uses coming within the scope of the invention as defined in the appended claims.

What is claimed is:

1. Digital circuit means comprising: first and second transistors each having a base, an emitter and a collector, means coupling the base of one of said first and second transistors to a reference signal, means coupling a binary input signal to the other base, means including collector resistor means and common emitter resistor means for connecting said transistors for differential amplifier operation, said collector resistor means and said common emitter resistor means being chosen so that said first and second transistors in responding to said binary input signal remain in their active region of operation, third and fourth transistors each having a base, an emitter and a collector, said third and fourth transistors being of opposite polarity type with respect to said first and second transistors, means coupling the base of each of said third and fourth transistors to a respective one of the collectors of said first and second transistors so as to be switchable between saturated and cut off states in response thereto, and first and second means respectively coupling the collectors of said third and fourth transistors so as to provide oppositely opposed binary signal outputs in response to said binary input signal each having substantially the same magnitudes as said binary input signal.

2. Digital circuit means comprising: first and second differential amplifier transistors each having a base, an emitter and a collector, means coupling the base of said second differential amplifier transistor to a reference signal, means coupling the base of said first differential amplifier to a binary input signal, a voltage source, first collector resistance means having one end coupled to said voltage source and the other end coupled to the collector of said first differential amplifier transistor, second collector resistance means having one end coupled to said voltage source and the other end coupled to the collector of said second differential amplifier transistor, common emitter resistance means coupling together the emitters of said differential amplifier transistors, said emitter and collector resistance means being chosen so that in response to said binary input signal both of said transistors remain in their active region of operation with one of said differential amplifier transistors conducting a significant amount of collector current while the other differential amplifier transistor remains just barely conducting, first and second output transistors each having a base, an emitter, and a collector, said first and second output transistors beings of opposite polarity type with respect to said first and second differential amplifier transistors, the base of said first output transistor being coupled to the collector of said first differential amplifier transistor and the base of said second output transistor being coupled to the collector of said second differential amplifier transistor, said first and second output transistors being responsive to said differential amplifier transistors so that one of said output transistors will be cut off and the other saturated in response to one logical level of said binary input signal and vice versa in response to the other logical level of said binary input signal, means including a voltage divider coupled to the collector of said first output transistor for providing a first binary output signal having substantially the same levels as said binary input signal, and means including a voltage divider coupled to the collector of said second output transistor for providing a second binary output signal having substantially the same levels as said binary input signal and oppositely phased with respect to said first binary output signal.

3. Digital circuit means comprising: first and second differential amplifier transistors each having a base, an emitter and a collector, means coupling the base of said second differential amplifier transistor to a reference signal, means coupling the base of said first differential amplifier transistor to a binary input signal, a voltage source, first collector resistance means having one end coupled to said voltage source and the other end coupled to the collector of said first differential amplifier transistor, second collector resistance means having one end coupled to said voltage source and the other end coupled to the collector of said second differential amplifier transistor, common emitter resistance means coupling together the emitters of said differential amplifiers, said emitter and collector resistance means being chosen in conjunction with said binary input signal so that in response to said binary input signal both of said transistors remain in their active region with one of said differential amplifier transistors conducting a significant amount of collector current while the other differential amplifier transistor remains just barely conducting, first and second output transistors each having a base, an emitter, and a collector, said first and second output transistors being of opposite polarity type with respect to said first and second differential amplifier transistors, the base of said first output transistor being coupled to the collector of said first differential amplifier transistor and the base of said second output transistor being coupled to the collector of said second differential output transistor, said first and second output transistors being responsive to said differential amplifier transistors so that one of said output transistors will be cut off and the other saturated in response to one logical level of said binary input signal and vice versa in response to the other logical level of said binary input signal, means including a voltage divider coupled to the collector of said first output transistor for providing a first binary output signal having substantially the same levels as said binary input signal, and means including a voltage divider coupled to the collector of said second output transistor for providing a second binary output signal having substantially the same levels as said binary input signal and oppositely phased with respect to said first binary output signal and means including first and second diodes coupled in parallel in oppositely poled directions between the base and emitter of said first differential amplifier transistor for limiting the magnitude of the signal applied thereto.

4. Digital circuit means comprising: a differential amplifier including first and second emitter-coupled differential amplifier transistors, each having a base, an emitter and a collector, means coupling a binary input signal to the base of one differential amplifier transistor and a reference signal to the base of the other differential amplifier transistor, first and second output transistors, means coupling said output transistors to respective ones of the collectors of said differential amplifier transistors, said output transistors being switchable between saturated and cut off states in response to said differential amplifier transistors so as to provide oppositely phased binary output signals, logical circuit means for forming said binary input signal, means applying at least one logical information input signal to said logical circuit means, means for applying an output signal from one of said output transistors to said logical circuit means so as to cause latching of said differential amplifier in accordance therewith, means for applying a first timing signal to said logical circuit means so as to cause said logical information input signal to be applied to said differential amplifier as said binary input signal during a predetermined time period, and means for applying a second timing signal to said logical circuit means for disconnecting said output signal from said differential amplifier during a predetermined time period chosen so as to prevent said output signal from interfering with the response of said differential amplifier to said logical information input signal while permitting latching of said amplifier after said response has occurred.

5. Digital circuit means comprising: a differential amplifier including first and second emitter-coupled differential amplifier transistors, each having a base, an emitter and a collector, means coupling a binary input signal to the base of one differential amplifier transistor and a reference signal to the base of the other differential amplifier transistor both of said transistors remaining in their active region of operation in response to said binary input signal, first and second output transistors of opposite polarity type with respect to said first and second differential amplifier transistors, means coupling said output transistors to respective ones of the collectors of said differential amplifier transistors, said output transistors being switchable between saturated and cut off states in response to said differential amplifier transistors so as to provide oppositely phased binary output signals, logical circuit means for forming said binary input signal, means for applying at least one timing signal and at least one logical information signal to said logical circuit means, and means for applying the output signal of one of said output transistors to said logical circuit means for logical combination with said timing signal in a manner so as to permit said differential amplifier to be latched in accordance with said logical information signal while permitting said differential amplifier to respond to said logical information signal without interference from said output signal.

6. A latch circuit comprising: a differential amplifier circuit including first and second differential amplifier transistors, means for applying a binary input signal to one differential amplifier transistor and a reference signal to the other differential amplifier transistor, means connected to said differential amplifier transistors for providing at least one binary output signal in response to said binary input signal, logical circuit means for forming said binary input signal and to which said binary output signal is applied, means for applying a timing signal to said logical circuit means, and means for applying an information signal to said logical circuit means, said logical circuit means including means for causing said information signal to be applied to said differential amplifier for setting in accordance therewith during a predetermined time period, said logical circuit means also including means for causing said binary output signal applied thereto to act in cooperation with said timing signal to latch said differential amplifier in the state to which it is set by said information signal while permitting said differential amplifier circuit to respond to said information signal without interference from said binary output signal.

7. A latch circuit comprising: first and second transistors each having a base, an emitter and a collector, means coupling the base of one of said first and second transistors to a reference signal, means coupling a binary input signal to the other base, means including collector resistor means and common emitter resistor means for connecting said transistors for differential amplifier operation, said collector resistor means and said common emitter resistor means being chosen so that said first and second transistors in responding to said binary input signal remain in their active region of operation, third and fourth transistors each having a base, an emitter and a collector, said third and fourth transistors being of opposite polarity type with respect to said first and second transistors, and means coupling the base of each of said third and fourth transistors to a respective one of the collectors of said first and second transistors, means coupled to said third and fourth transistors for providing at least one binary output signal in response to said binary input signal having logical levels of substantially the same magnitudes as said binary input signal, logical circuit means for forming said binary input signal and to which said binary output signal is applied, means for applying a timing signal to said logical circuit means, and means for applying an information signal to said logical circuit means, said logical circuit means including means for causing said information signal to be applied to said differential amplifier for setting in accordance therewith during a predetermined time period, said logical circuit means also including means for causing said binary output signal applied thereto to act in cooperation with said timing signal to latch said differential amplifier in the state to which it is set by said information signal while permitting said differential amplifier to respond to said information signal without interference from said binary output signal.

8. The invention in accordance with claim 4 wherein the predetermined time period of said second timing signal occurs prior to the predetermined time period of said first timing signal in order to permit clearing said differential amplifier prior to responding to said logical information signal.

9. The invention in accordance with claim 7, wherein the predetermined time period of said first and second timing signals occur concurrently.

10. The invention in accordance with claim 9, wherein a storage network is provided at the input to the differential amplifier for retaining the state of said differential amplifier for a sufficient period termination of the predetermined time period of said first timing signal to permit said binary output signal cooperating with said second timing signal to latch the circuit.

11. A flip-flop comprising: a differential amplifier circuit including first and second differential amplifier transistors, means for applying a binary input signal to one differential amplifier transistor and a reference signal to the other differential amplifier transistor, means connected to said differential amplifier transistors for providing at least one binary output signal in response to said binary input signal, logical input circuit means for applying a binary input signal to the input of said differential amplifier, means for applying said binary output signal to said logical input circuit means, means for applying a first timing signal to said logical input circuit means for cooperation with said binary output signal so as to obtain latching of said flip-flop, a delay means, means for applying an information signal to said logical input circuit means via said delay means, means for applying a second timing signal to said logical input circuit means so as to cause the delay information signal to be applied to said differential amplifier as said binary input signal during a predetermined time period, said first timing signal cooperating with said binary output signal to disenable the latching operation of said output signal during a predetermined time period chosen so as to prevent interference with the response of said differential amplifier to said information signal while permitting latching of said amplifier after said response has occured.

12. A flip-flop comprising: a differential amplifier having an input to which a binary input signal is applied and at least one binary output signal responsive thereto, logical input circuit means for applying a binary input signal to the input of said differential amplifier, means for applying said binary output signal to said logical input circuit means, means for applying a first timing signal to said logical input circuit means, means for applying a second timing signal to said logical input circuit means, an inductive delay means, means for applying an information signal to said logical input circuit means via said delay means, said logical input circuit means including means responsive to said first timing signal and the delayed information signal for applying the delayed information signal to the input of said differential amplifier, said logical input circuit means including means responsive to said second timing signal and said binary output signal for latching said differential amplifier in accordance with the state to which it is set by the delayed information signal while preventing said output signal from interfering with the setting of said differential amplifier by said delayed information signal, said inductive delay being chosen to be of sufficient magnitude so as to insure reliable latching in the event said information signal changes prematurely, and means for applying an input signal to the input of said differential amplifier for setting said flip-flop to a particular state independently of said logical input circuit means.

13. A flip-flop comprising: first and second transistors each having a base, an emitter and a collector, means coupling the base of one of said first and second transistors to a reference signal, means coupling a binary input signal to the other base, means including collector resistor means and common emitter resistor means for connecting said transistors for differential amplifier operation, said collector resistor means and said common emitter resistor means being chosen so that said first and second transistors in responding to said binary input signal remain in their active region of operation, third and fourth transistors each having a base, an emitter and a collector, said third and fourth transistors being of opposite polarity type with respect to said first and second transistors, and means coupling the base of each of said third and fourth transistors to a respective one of the collectors of said first and second transistors, means coupled to said third and fourth transistors for providing at least one binary output signal in response to said binary input signal having logical levels of substantially the same magnitudes as said binary input signal, logical input circuit means, means for applying a first timing signal to said logical input circuit means, means for applying a second timing signal to said logical input circuit means, an inductive delay means, and means for applying an information signal to said logical input circuit means via said delay means, said logical input circuit means including means responsive to said first timing signal and the delayed information signal for applying the delayed information signal to the input of said differential amplifier, said logical input circuit means including means responsive to said second timing signal and said binary output signal for latching said differential amplifier in accordance with the state to which it is set by the delayed information signal, said inductive delay being chosen to be of sufficient magnitude so as to insure reliable latching in the event said information signal changes prematurely.

14. The invention in accordance with claim 13, wherein said first timing signal goes true concurrently with said second timing signal going false.

15. The invention in accordance with claim 12, wherein a transistor amplifier having a diode clamping circuit at its input is interposed between the output of said inductive delay mean and said logical input circuit means.

16. An "exclusive or" circuit comprising: first and second transistors each having a base, an emitter and a collector, means coupling the base of said first transistor to the emitter of said second transistor and the base of said second transistor to the emitter of said first transistor, first impedance means, means coupling the collectors of said first and second transistors in parallel with respect to said first impedance means, third and fourth transistors each having a base, an emitter and a collector, means applying a first binary input signal to the base of said third transistor and a second binary input signal to the base of said fourth transistor, second impedance means, means coupling the collector of said third transistor to said second impedance means, means interconnecting said first and third transistors so as to form a first emitter-coupled differential amplifier, means interconnecting said second and fourth transistors so as to form a second emitter-coupled differential amplifier, first output means coupled to said first impedance means for providing a first binary output signal producing the Boolean function $EF+E'F'$ wherein E and F respectively represent said first and second binary input signals, and second output means coupled to said second impedance means for providing a second binary output signal producing the Boolean function EF'.

17. An "exclusive or" circuit comprising: first and second transistors each having a base, an emitter and a collector, means coupling the base of said first transistor to the emitter of said second transistor and the base of said second transistor to the emitter of said first transistor, first collector impedance means, means coupling the collectors of said first and second transistors in parallel with respect to said first collector impedance means, third and fourth transistors each having a base, an emitter and a collector, means applying a first binary input signal to the base of said third transistor and a second binary input signal to the base of said fourth transistor, second collector impedance means, means coupling the collectors of said third and fourth transistors in parallel with respect to said second collector impedance means, first emitter impedance means coupling the emitters of said first and third transistors and second emitter impedance means coupling the emitters of said second and fourth transistors, said first and second collector impedance means and said first and second emitter impedance means being chosen so that each of said first, second, third and fourth transistors remain in their active region of operation in response to said first and second binary input signals with only one of said first and third transistors and only one of said second and fourth transistors conducting a significant amount of collector current while the other remains just barely conducting, first output means including an output transistor coupled to said first collector impedance means so as to be switchable between saturated and cutoff states in response to the states of said first and second transistors for providing a first binary output signal which has one logical level when at least one of said first and second transistors is conducting a significant amount of current and the other logical level otherwise, and second output means including an output transistor coupled to said second impedance means so as to be switchable between saturated and cutoff states in response to the states of said third and fourth transistors for providing a second binary output signal oppositely phased with respect to said first binary output signal which has said one logical level only when both of said third and fourth transistors are conducting a significant amount of current and the other logical level otherwise, said output transistors being of opposite polarity type with respect to said first, second, third and fourth transistors, and said first and second output means each including voltage divider means cooperating with its respective output transistor for producing logical levels for said first and second binary output signals having substantially the same magnitudes as said first and second binary input signals.

18. A logical circuit comprising: first and second transistors each having a base, an emitter and a collector, means coupling the base of said first transistor to the emitter of said second transistor and the base of said second transistor to the emitter of said first transistor, first impedance means, means coupling the collectors of said first and second transistors in parallel with respect to said first impedance means, third and fourth transistors each having a base, an emitter and second impedance means, means coupling the collector of said third transistor to said second impedance means, each of said first, second, third and fourth transistors being operative to reside in either a first or a second state depending upon the logical levels of said first and second binary input signals, first output means coupled to said first impedance means for providing a first binary output signal which has one logical level when either of said first and third transistors is in said first state and the other logical level otherwise, and second output means coupled to said second impedance means for providing a second binary output signal which has said one logical level when said third transistor is in said first state and the other logical level otherwise.

19. The invention in accordance with claim 18, wherein said first and second output means each includes a transistor of opposite polarity type with respect to said first, second, third and fourth transistors, and wherein each of said first, second, third and fourth transistors remain in their active region during operation.

20. The invention in accordance with claim 14, wherein a storage network is provided at the input to the differential amplifier from said logical circuit means for retaining the state of said differential amplifier for a sufficient period after removal of said information signal to permit said binary output signal cooperating with said second timing signal to latch the flip-flop.

21. The invention in accordance with claim 14, wherein means are provided for applying a true signal to the input of said differential amplifier for setting said flip-flop to a true state independently of said logical input circuit means.

References Cited

UNITED STATES PATENTS

| | | | |
|---|---|---|---|
| 2,840,727 | 6/1958 | Guggi | 307—88.5 |
| 2,947,882 | 8/1960 | Chou | 307—88.5 |
| 3,003,071 | 10/1961 | Henle | 307—88.5 |
| 3,005,112 | 10/1961 | Meade | 307—88.5 |
| 3,020,417 | 2/1962 | Cheilik | 307—88.5 |
| 3,031,587 | 4/1962 | Ord et al. | 307—88.5 |
| 3,046,485 | 7/1962 | Brown | 328—195 |
| 3,054,910 | 9/1962 | Bothwell | 307—88.5 |
| 3,075,155 | 1/1963 | Reaves | 330—69 |
| 3,094,632 | 6/1963 | Wartella | 307—88.5 |
| 3,147,388 | 1/1964 | Clark | 307—88.5 |

ARTHUR GAUSS, *Primary Examiner.*

R. H. EPSTEIN, I. C. EDELL, S. D. MILLER, *Assistant Examiners.*

UNITED STATES PATENT OFFICE
CERTIFICATE OF CORRECTION

Patent No. 3,355,596 November 28, 1967

Robert O. Gunderson et al.

It is hereby certified that error appears in the above numbered patent requiring correction and that the said Letters Patent should read as corrected below.

Column 2, line 26, after "level" insert -- output J will also be at a false logical level --; column 8, line 16, for "true" read -- truth --; column 10, line 32, for "opposed" read -- phased --; column 13, line 28, after "period" insert -- after --; line 49, for "delay" read -- delayed --.

Signed and sealed this 21st day of January 1969.

(SEAL)
Attest:

Edward M. Fletcher, Jr.
Attesting Officer

EDWARD J. BRENNER
Commissioner of Patents